(12) United States Patent
Ohba

(10) Patent No.: US 7,058,491 B1
(45) Date of Patent: Jun. 6, 2006

(54) ABNORMALITY DETECTING APPARATUS FOR WHEEL SPEED SENSORS AND AUTOMOBILE INCORPORATING THE SAME

(75) Inventor: Mitsuru Ohba, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/239,017

(22) Filed: Sep. 30, 2005

(30) Foreign Application Priority Data

Nov. 12, 2004 (JP) .............................. 2004-328974

(51) Int. Cl.
*G06F 7/00* (2006.01)

(52) U.S. Cl. ............................ 701/34; 701/36; 701/70; 701/82

(58) Field of Classification Search ................... 701/29, 701/34, 33, 35, 31, 36, 69, 70, 71, 74, 76, 701/75, 82, 83, 84; 180/197
See application file for complete search history.

(56) References Cited

U.S. PATENT DOCUMENTS 6,480,771 B1 * 11/2002 Nishida et al. ............... 701/34
6,484,080 B1 * 11/2002 Breed .......................... 701/36
6,485,114 B1 * 11/2002 Marlett et al. ............... 303/168
6,519,515 B1 * 2/2003 Baumann et al. ............. 701/34
6,678,593 B1 * 1/2004 Kachel et al. ................ 701/34
6,682,153 B1 * 1/2004 Okai ..................... 303/122.05

FOREIGN PATENT DOCUMENTS

JP          11-291886          10/1999

\* cited by examiner

*Primary Examiner*—Richard M. Camby
(74) *Attorney, Agent, or Firm*—Oblon, Spivak, McClelland, Maier & Neustadt, P.C.

(57) ABSTRACT

Wheel speed sensors arranged at each of driving wheels and idler wheels detect rotational speeds of corresponding wheels. ECU includes a wheel speed calculating portion calculating wheel speeds of the driving wheels and the idler wheels based on the detected rotational speeds, and an abnormality detecting portion detecting abnormality of the wheel speed sensors based on the calculated wheel speeds. The abnormality detecting portion detects the abnormality of the wheel speed sensors based on: a first wheel speed that is at least one of the wheel speeds of the driving wheels and the idler wheels being substantially zero; at least one of the wheel speeds except for the first wheel speed being greater than a prescribed threshold value; and an average wheel speed of the idler wheels being greater than an average wheel speed of the driving wheels.

5 Claims, 3 Drawing Sheets

ABNORMALITY DETECTING APPARATUS FOR WHEEL SPEED SENSORS AND AUTOMOBILE INCORPORATING THE SAME

This nonprovisional application is based on Japanese Patent Application No. 2004-328974 filed with the Japan Patent Office on Nov. 12, 2004, the entire contents of which are hereby incorporated by reference.

BACKGROUND OF THE INVENTION

1. Field of the Invention

The present invention relates to an abnormality detecting apparatus for wheel speed sensors and an automobile incorporating the same. More specifically, it relates to an abnormality detecting apparatus for wheel speed sensors with detection performance of high accuracy and an automobile incorporating the same.

2. Description of the Background Art

Conventionally, wheel speed sensors for detecting the wheel speed of each wheel are incorporated in an ABS (Antilock Brake System) apparatus that prevents wheels from locking during braking, or in an automatic braking apparatus that generates braking force for preventing slip or generating yaw moment to stabilize the attitude of the vehicle that is becoming unstable. As normal control of those apparatuses is lost if there is abnormality with the wheel speed sensors, abnormality detection of the wheel speed sensors is frequently conducted.

As means for detecting abnormality of wheel speed sensors, for example, Japanese Patent Laying-Open No. 11-291886 discloses an abnormality detecting apparatus for wheel speed sensors, of which object is to improve detection accuracy.

FIG. 4 is a control block diagram of the abnormality detecting apparatus for wheel speed sensors described in Japanese Patent Laying-Open No. 11-291886.

Referring to FIG. 4, the abnormality detecting apparatus for wheel speed sensors includes wheel speed sensors 70a outputting signals respectively responsive to rotational speeds of wheels FL, FR, RL, and RR (not shown), wheel speed calculating means 70b for calculating wheel speeds based on the signals from respective wheel speed sensors 70a, wheel acceleration calculating means 70c for calculating wheel acceleration, wheel speed sensor abnormality determining means 70d for determining abnormality of wheel speed sensors 70a based on a result of the calculation by wheel speed calculating means 70b, and wheelspin determining means 70e for determining wheelspin of driving wheels based on a result of the calculation by wheel accelerations calculating means.

In this configuration, wheel speed sensor abnormality determining means 70d involves, as to the result of calculation of the wheel speeds, an abnormality determination condition as follows: while the rotational speed of at least one wheel is at least a prescribed speed, the rotational speed of other wheel is 0 km/h. Specifically, wheel speed sensor abnormality determining means 70d obtains an assumed vehicle speed based on signals from respective wheel speed sensors 70a, and compares the assumed vehicle speed and detected wheel speeds detected by respective wheel speed sensors 70a. In response to a difference between them exceeding a prescribed value being continued for at least a prescribed period, wheel speed sensor abnormality determining means 70d determines that wheel speed sensors 70a are abnormal. Here, wheel speed sensor abnormality determining means 70d determines that a wheel speed sensor 70a corresponding to a wheel having a rotational speed of 0 km/h is abnormal.

However, on a road surface with a low friction coefficient (hereinafter also referred to as low μ) such as of a snow-covered road, if a state where a vehicle hardly moves while the driving wheels are slipping (the wheelspin state) is continued, wheel speed sensors 70a of the driving wheels show detection values of high speeds, whereas wheel speed sensors 70a of idler wheel show detection values of substantially 0 km/h. When this wheelspin state is continued for a prescribed period, wheel speed sensor abnormality determining means 70d determines that wheel speed sensors 70a, which are actually normal, are abnormal.

Accordingly, the abnormality detecting apparatus for wheel speed sensors shown in FIG. 4 is configured such that, when wheelspin determining means 70e determines wheelspin, a determination operation of wheel speed sensor abnormality determining means 70d is suspended. Specifically, wheelspin determining means 70e determines that wheelspin has occurred when wheel acceleration of the driving wheels has exceeded the wheel acceleration that would be possible during normal road-gripping driving. Wheelspin determining means 70e has a wheelspin timer (not shown) for measuring a predetermined time, and while the wheelspin timer is measuring the predetermined time, an abnormality determination operation by wheel speed sensor abnormality determining means 70d is suspended.

With such a configuration, the abnormality detecting apparatus for wheel speed sensors can prevent erroneous abnormality determination due to wheelspin of the driving wheels.

As above, the conventional abnormality detecting apparatus for wheel speed sensors is characterized in that a result of the determination by wheelspin determining means 70e is considered as a condition for establishing an abnormality determination operation at wheel speed sensor abnormality determining means 70d in order to improve the detection accuracy.

However, the conventional abnormality detecting apparatus for wheel speed sensors involves the following problem as to the determination accuracy of wheelspin determining means 70e itself.

In general, wheel acceleration can be obtained from the following equation expressing driving force exerted on the driving wheels:

$$I \cdot d\omega = T - \mu \cdot W \cdot R \qquad (1)$$

where, I: wheel inertia (kg/m$^2$), dω: wheel acceleration (m/s$^2$), T: input torque (N·m), μ: road surface frictional coefficient, W: weight on the ground (N), R: wheel radius (m).

As apparent from equation (1), wheel acceleration dω largely changes depending on input torque T (proportional to acceleration pedal depression), road surface frictional coefficient μ, and weight on the ground W. On the other hand, actually it is difficult to accurately detect road surface frictional coefficient μ and weight on the ground W, and it is not easy to accurately determine wheel acceleration dω. Therefore, in the conventional abnormality detecting apparatus for wheel speed sensors, wheelspin determining means 70e that is based on wheel acceleration dω yields varied determination result, and the abnormality detection accuracy is not always high.

Meanwhile, among four-wheel-drive (4WD) vehicles, what is called standby 4WD is known, which normally travels employing either front wheels or rear wheels as driving wheels and, when relative rotation occurs between the front and rear wheels due to slip or the like, motive power is transmitted to the other rear or front wheels to achieve four-wheel driving.

Specifically, with standby 4WD, rotational speeds of the driving wheels and rotational speeds of the idler wheels are detected, and based on the difference between them, a relative rotation number between the driving wheels and the idler wheels is detected. Further, transmission torque (differential limiting torque) in accordance with the detected relative rotation number is transmitted to the idler wheels via a power transmission, whereby the idler wheels are driven.

In such a configuration, the rotational speeds of the driving wheels and that of the idler wheels are respectively detected by wheel speed sensors arranged at respective wheels. Accordingly, with standby 4WD, it is critical that the wheel speed sensors are normal in order to correctly control switching between two-wheel drive (2WD) and four-wheel drive. When the wheel speed sensors are abnormal, actuation of four-wheel drive is prohibited, since correct control cannot be continued. Specifically, with standby 4WD, based on abnormality detection information on the wheel speed sensors, prohibition/permission of actuation of four-wheel drive is determined. Here, if the abnormality detection accuracy of the abnormality detecting apparatus for wheel speed sensors is low, the wheel speed sensors that are actually normal are erroneously determined to be abnormal, whereby actuation of four-wheel drive is prohibited and the drivability may be decreased. Accordingly, particularly high detection accuracy is required for the abnormality detecting apparatus for wheel speed sensors incorporated in a vehicle employing standby 4WD scheme.

However, as described above, the conventional abnormality detecting apparatus for wheel speed sensors cannot yet guarantee full detection accuracy, as the wheelspin determination is difficult.

SUMMARY OF THE INVENTION

An object of the present invention is to provide an abnormality detecting apparatus for wheel speed sensors with high detection accuracy.

Another object of the present invention is to provide a vehicle incorporating an abnormality detecting apparatus for wheel speed sensors with high accuracy.

According to the present invention, an abnormality detecting apparatus for wheel speed sensors detecting abnormality of wheel speed sensors arranged at each of driving wheels and idler wheels of a vehicle is provided, wherein the wheel speed sensors detect rotational speeds of corresponding driving wheels and idler wheels. The abnormality detecting apparatus for wheel speed sensors includes a wheel speed calculating portion calculating wheel speeds of the driving wheels and wheel speeds of the idler wheels based on the detected rotational speeds of the driving wheels and the detected rotational speeds of the idler wheels, respectively, and an abnormality detecting portion detecting abnormality of the wheel speed sensors based on the calculated wheel speeds. The abnormality detecting portion detects the abnormality of the wheel speed sensors based on: a first wheel speed that is at least one of the wheel speeds of the driving wheels and the idler wheels being substantially zero; at least one of the wheel speeds except for the first wheel speed being greater than a prescribed threshold value; and an average wheel speed of left and right idler wheels being greater than an average wheel speed of left and right driving wheels.

Preferably, the vehicle includes a power transmission transmitting motive power to the idler wheels. The abnormality detecting portion stops a motive power transmission operation of the power transmission when abnormality of the wheel speed sensors is detected.

Preferably, the power transmission transmits to the idler wheels motive power commensurate to a relative rotation number between the driving wheels and the idler wheels.

Preferably, the prescribed threshold value is a detection value of the wheel speeds that can be detected by the wheel speed sensors when the vehicle travels normally, and it is a value greater than a maximum value of the wheel speeds detected when the vehicle makes a turn.

According to the present invention, an automobile is provided. The automobile includes: a motive power source; driving wheels that receive motive power transmitted from the motive power source and drive; idler wheels; wheel speed sensors arranged at each of the driving wheels and the idler wheels for detecting rotational speeds of corresponding the driving wheels and the idler wheels; and the abnormality detecting apparatus for wheel speed sensors detecting abnormality of the wheel speed sensors according to any of claims 1–4.

According to the present invention, with a simple apparatus configuration, an abnormality detecting apparatus for wheel speed sensors with high detection accuracy can be implemented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
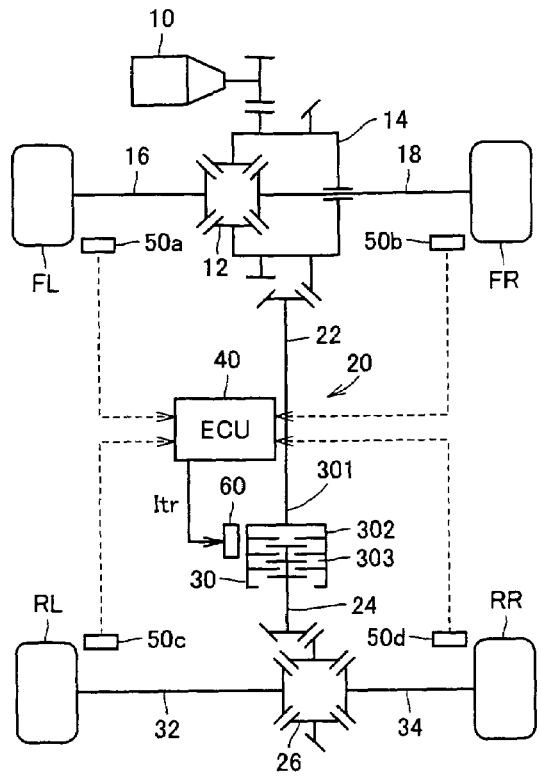
FIG. 1 is a schematic view showing a vehicle incorporating an abnormality detecting apparatus for wheel speed sensors according to an embodiment of the present invention.

In the following, an embodiment of the present invention will be described in detail referring to the drawings. Throughout the drawings, identical reference characters denote identical or corresponding parts.

FIG. 1 is a schematic view showing a vehicle incorporating an abnormality detecting apparatus for wheel speed sensors according to the embodiment of the present invention. It is noted that, in the following description, it is assumed that the vehicle employs what is called front-wheel based standby 4WD scheme, where front wheels FL and FR are driving wheels and rear wheels RL and RR are idler wheels.

Referring to FIG. 1, the vehicle includes an engine 10, a front differential 12, axles 16, 18, 32, and 34, front wheels FL and FR, rear wheels RL and RR, a propeller shaft 20, a power transmission 30, a linear solenoid valve 60, a rear differential 26, an ECU (Electrical Control Unit) 40, and wheel speed sensors 50a–50d.

An output of engine 10 is split from front differential 12 to left and right axles 16 and 18, and transmitted to left and right front wheels FL and FR, which are the driving wheels.

Front differential 12 includes an input rotary member 14. Input rotary member 14 is coupled to propeller shaft 20 via a bevel gear.

Propeller shaft 20 is divided into a front shaft 22 coupled to input rotary member 14 and a rear shaft 24 coupled to rear differential 26 via a bevel gear, between which power transmission 30 is arranged. It is noted that front shaft 22 and rear shaft 24 can relatively rotate with a rotational speed difference that is commensurate to a rotational speed difference between front wheels FL and FR and rear wheels RL and RR.

Power transmission 30 is constituted by a viscous coupling that utilizes the shearing resistance force of a viscous fluid of high viscosity such as silicon oil, for example.

Power transmission 30 has: a shaft 301 that is rotated axially and integrally with front shaft 22; a case 302 that is arranged at the outer periphery of shaft 301 to be capable of relatively rotating with shaft 301, and that forms a coupling chamber between an outer surface of shaft 301; and a coupling 303 that is arranged in the coupling chamber. Power transmission 30 transmits motive power that is commensurate to the relative rotation number between case 302 and shaft 301.

Linear solenoid valve 60 controls the pressure of a hydraulic fluid used in engagement and disengagement of coupling 303 of power transmission 30. Specifically, the pressure of the hydraulic fluid used in controlling the engagement force of coupling 303 is adjusted based on a line pressure from a not-shown oil pump. As the hydraulic fluid is supplied from the oil pump to a control valve (not shown), the control valve adjusts the pressure of the hydraulic fluid to a desired line pressure based on the control pressure from linear solenoid valve 60.

Linear solenoid valve 60 is controlled by a control current Itr from ECU 40, as shown in FIG. 1. As will be described later, control current Itr is calculated at ECU 40 based on an engagement force of coupling 303 required for transmitting desired motive power. Linear solenoid valve 60 generates a control pressure that increases in accordance with an increase in control current Itr, and exerts the generated control pressure to the not-shown control valve. It is noted that, when control current Itr is 0, no control pressure is generated and therefore, coupling 303 is disengaged and does not transmit motive power.

Rear differential 26 is coupled to left and right rear wheels RL and RR via left and right axles 32 and 34.

Wheel speed sensors 50a–50d detect the rotational speeds of respective corresponding wheels FL, FR, RL, and RR, and output the detected rotational speeds to ECU 40.

ECU 40 receives pulse signals from wheel speed sensors 50a–50d commensurate to rotational speeds of respective corresponding wheels FL, FR, RL, and RR. ECU 40 calculates a relative rotation number $\Delta N$ between front and rear wheels based on the rotational speeds of wheels FL, FR, RL, and RR. ECU 40 calculates control current Itr based on an engagement force of coupling 303 required for transmitting transmission torque Tr that is commensurate to the magnitude of the obtained relative rotation number $\Delta N$, and outputs the calculated control current Itr to linear solenoid valve 60.

Further, ECU 40 calculates wheel speeds of wheels FL, FR, RL, and RR from the rotational speeds received from wheel speed sensors 50a–50d. Based on the obtained wheel speeds, ECU 40 conducts an abnormality detecting operation on wheel speed sensors 50a–50d by means of a method described later.

With the configuration described above, power transmission 30 is employed as coupling means of a standby 4WD. Specifically, when relative rotation number $\Delta N$ between front wheels FL and FR and rear wheels RL and RR is substantially 0, that is, when the rotational speed difference between front shaft 22 and rear shaft 24 is substantially 0, power transmission 30 does not transmit motive power as transmission torque Tr is 0 (control current Itr also corresponds to 0). Here, rear wheels RL and RR are the idler wheels that are rotated in accordance with the traveling of the vehicle.

Meanwhile, when a relative rotation has occurred between front wheels FL and FR and rear wheels RL and RR due to front wheels FL and FR being slipping or being ditched, linear solenoid valve 60 receives from ECU 40 control current Itr calculated based on transmission torque Tr that is commensurate to relative rotation number $\Delta N$ between front wheels FL and FR and rear wheels RL and RR. Then, power transmission 30, under the pressure control of linear solenoid valve 60, transmits motive power commensurate to transmission torque Tr to rear differential 26 through rear shaft 24. Thus, rear wheels RL and RR are rotary driven by engine 10.

Figure 2:
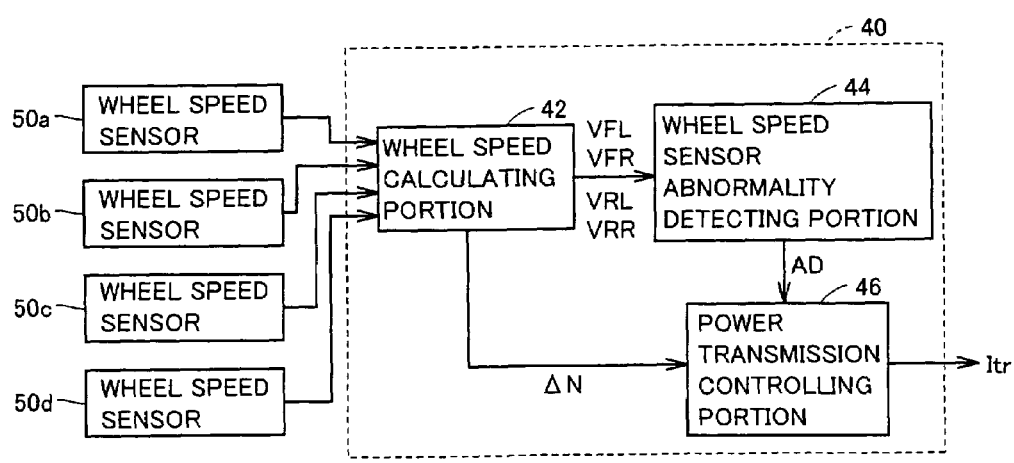
FIG. 2 is a control block diagram for describing an ECU shown in FIG. 1.

FIG. 2 is a control block diagram for describing ECU 40 shown in FIG. 1.

Referring to FIG. 2, ECU 40 includes a wheel speed calculating portion 42, a wheel speed sensor abnormality detecting portion 44, and power transmission controlling portion 46.

Wheel speed calculating portion 42 receives rotational speeds of wheels FL, FR, RL, and RR from wheel speed sensors 50a–50e. Based on the rotational speeds, wheel speed calculating portion 42 calculates wheels speeds VFR, VFL, VRL, VLL of wheels FL, FR, RL, and RR, respectively, and outputs the calculated wheel speeds VFR, VFL, VRL, and VLL to wheel speed sensor abnormality detecting portion 44. Wheel speed calculating portion 42 further determines relative rotation number $\Delta N$ between front wheels FL and FR and rear wheels RL and RR based on the rotational speeds of wheels FL, FR, RL, and RR, and transmits the obtained relative rotation number $\Delta N$ to power transmission controlling portion 46.

As described above, power transmission controlling portion 46 calculates control current Itr based on the engagement force of coupling 303 required for transmitting transmission torque Tr commensurate to the input relative rotation number $\Delta N$, and outputs the calculated control current Itr to linear solenoid valve 60 shown in FIG. 1.

When wheel speed sensor abnormality detecting portion 44 receives wheel speeds VFR, VFL, VRL, and RVV of wheels FR, RL, RL, and RR, respectively, it conducts an abnormality detecting operation on wheel speed sensors 50a–50d according to a method described in the following. It is noted that, when wheel speed sensor abnormality detecting portion 44 detects abnormality of wheel speed sensors 50a–50d, it outputs a signal AD specifying the detection result to power transmission controlling portion 46. Power transmission controlling portion 46 determines that wheel speed sensors 50a–50d are abnormal based on the input signal AD, and stops control for four-wheel drive.

Specifically, when power transmission controlling portion 46 receives signal AD, it sets control current Itr to 0 and outputs to linear solenoid valve 60. When linear solenoid valve 60 receives control current Itr at 0, it does not generate a control pressure and it disengages coupling 303 of power transmission 30 to stop transmission of motive power. Thus, four-wheel drive control is stopped, and two-wheel drive is continued or the control shifts to two-wheel drive.

Figure 3:
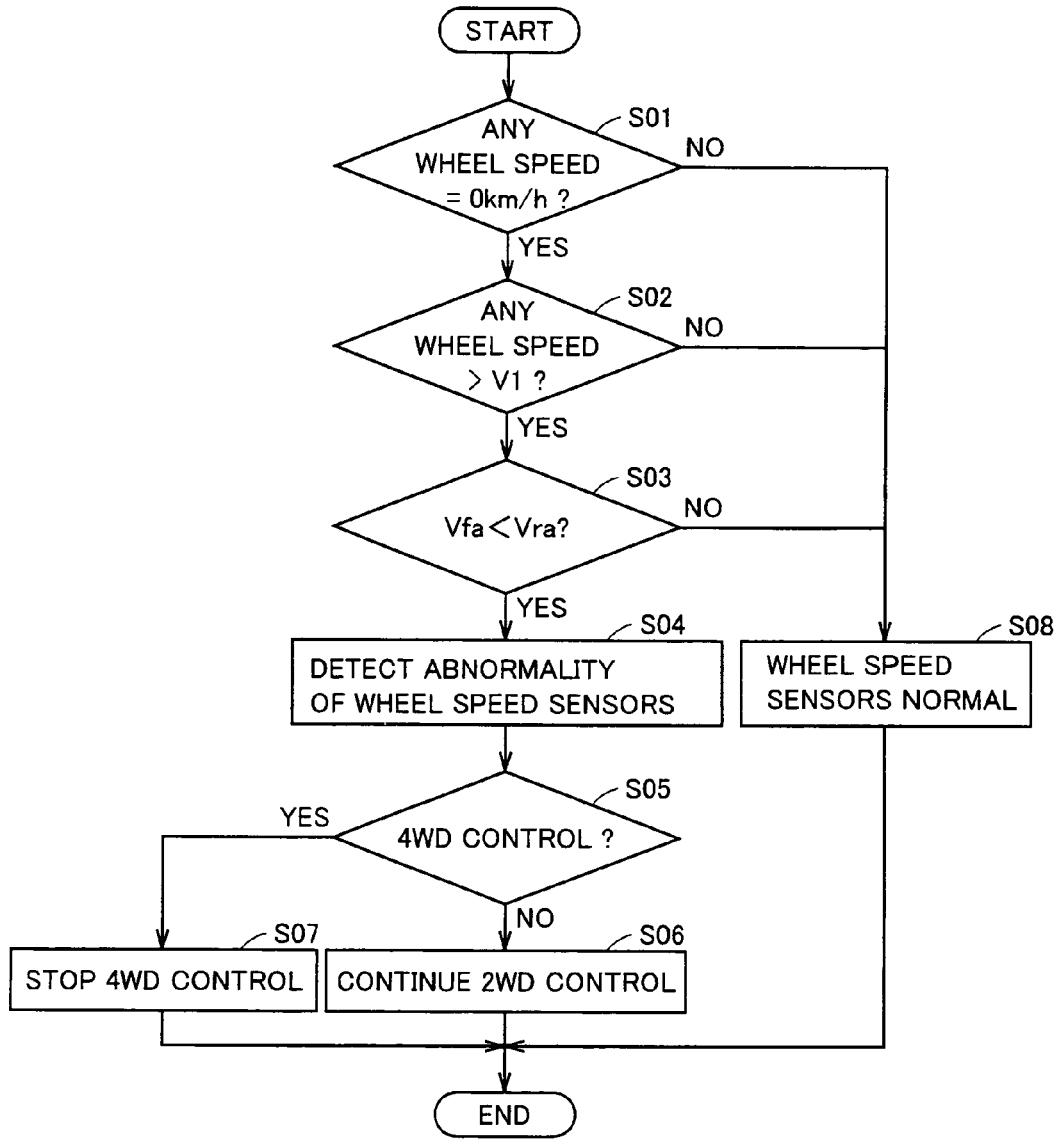
FIG. 3 is a flow chart for describing an abnormality detection operation of wheel speed sensors according to the present embodiment.
Figure 4:
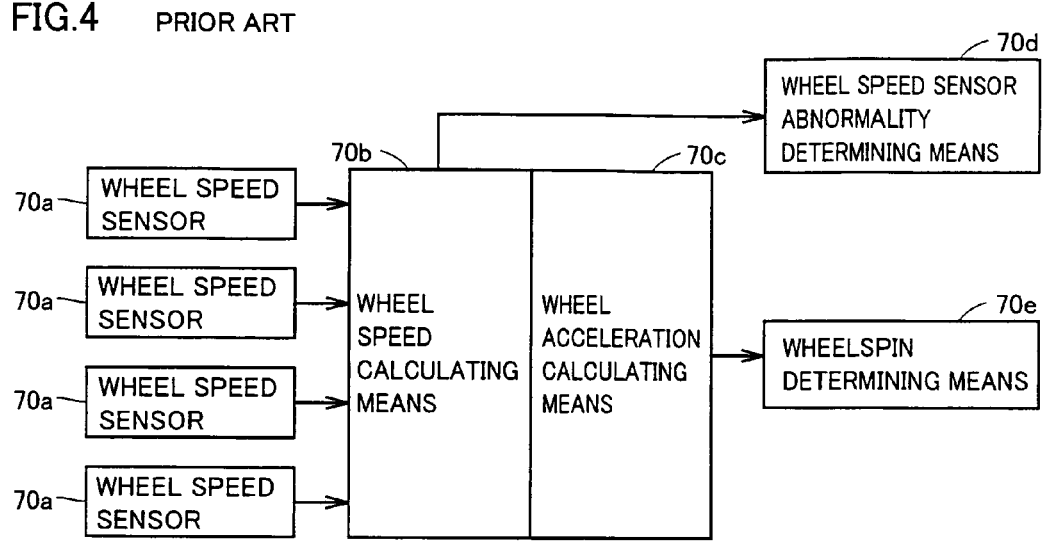
FIG. 4 is a control block diagram of the abnormality detecting apparatus for wheel speed sensors described in Japanese Patent Laying-Open No. 11-291886.

FIG. 3 is a flow chart for describing abnormality detection operation on wheel speed sensors according to the present embodiment.

Referring to FIG. 3, first, wheel speed sensor abnormality detecting portion 44 determines as to whether or not any of the input wheel speeds VFL, VFR, VRL, and VRR is 0 km/h (step S01). Here, when it is determined that none of wheel speeds VFR, VFL, VRL, and VRR are 0 km/h, wheel speed sensor abnormality detecting portion 44 determines that all of wheel speed sensors 50*a*–50*d* are normal (step S08), and ends the abnormality detecting operation.

On the other hand, if it is determined at step S01 that any of wheel speeds VFR, VFL, VRL, and VRR is 0 km/h, then it is determined as to whether or not any of wheel speeds VFR, VFL, VRL, and VRR is greater than a prescribed threshold value V1 (step S02).

Here, prescribed threshold value V1 is any wheel speed set within a prescribed wheel speed range that can be detected by the wheel speed sensors when the vehicle travels normally (for example, 10 km/h). It should be noted that this wheel speed range does not include wheel speeds when the vehicle travels at a low speed where the detection performance of wheel speed sensors 50*a*–50*d* is relatively low. When the vehicle is traveling at a low speed, wheel speed sensors 50*a*–50*d* cannot detect correct wheel speeds, and detect the wheel speeds to be 0 km/h.

In the abnormality detecting operation, in order not to detect a difference in rotation between front and rear wheels due to a turning radius difference of a vehicle making a turn as abnormality of wheel speed sensors 50*a*–50*d*, prescribed threshold value V1 is set to a value greater than the maximum value of the wheel speeds of front wheels FR, FR when making a turn. Specifically, when the vehicle makes a turn, if the wheel speed of the innermost rear wheel exhibits 0 km/h and the wheel speed of the outermost front wheel exhibits a prescribed value (V0 km/h; V0 is a value greater than 0), prescribed threshold value V1 is set to a value greater than prescribed value V0.

At step S02, when it is determined that all of wheel speeds VFR, VFL, VRL, and VRR are at most at prescribed threshold value V1, wheel speed sensor abnormality detecting portion 44 determines that all of wheel speed sensors 50*a*–50*d* are normal (step S08), and ends the abnormality detecting operation.

On the other hand, if it is determined at step S02 that any of wheel speeds VFR, VFL, VRL, and VRR exceeds prescribed threshold value V1, wheel speed sensor abnormality detecting portion 44 compares the magnitude of average wheel speed Vfa of front wheels FL and FR and that of average wheel speed Vra of rear wheels RL and RR (step S03). Average wheel speed Vfa of front wheels FL and FR is an average value of wheel speeds VFL and VFR of left and right front wheels FL and FR. Average wheel speed Vra of rear wheels RL and RR is an average value of wheel speeds VRL and VRR of left and right rear wheels RL and RR. Both of average wheel speeds Vfa and Vra are calculated at wheel speed sensor abnormality detecting portion 44.

Here, as a front-wheel drive base standby 4WD is employed as the vehicle according to the present embodiment, in either case of two-wheel drive and four-wheel drive, average wheel speed Vra of rear wheels RR and RL that are the idler wheels never exceeds average wheel speed Vfa of front wheels FL and FR that are the driving wheels.

Specifically, in two-wheel drive, rear wheels RL and RR are the idler wheels that are rotated in accordance with the drive by the front wheels, and therefore the wheel speeds thereof is always slower than those of front wheels FL and FR.

In four-wheel drive, in addition to front wheels FL and FR, rear wheels RL and RR also receive transmission of driving force of engine 10 and thereby caused to drive. Here, the driving force is based on torque distribution for suppressing relative rotation between the front and rear wheels when the rotational speeds of front wheels FL and FR exceed the rotational speed of rear wheels RL and RR due to slip or the like. Accordingly, it can be said that the wheel speeds of rear wheels RL and RR that are the idler wheels hardly exceed the wheel speeds of front wheels FL and FR that are the driving wheels, when the wheel speed sensors are normal.

Therefore, in the present embodiment, at step S03, wheel speed sensor abnormality detecting portion 44 determines that wheel speed sensors 50*a*–50*d* are abnormal based on detection that average wheel speed Vra of rear wheels RL and RR that are the idler wheels has exceeded average wheel speed Vfa of front wheels FL and FR that are the driving wheels in a front-wheel drive base standby 4WD (step S04). Thus, the difficult wheelspin determination is not required as a condition for establishing the abnormality detection operation, and therefore, the abnormality detection on wheel speed sensors 50*a*–50*d* can be conducted easily and in higher accuracy.

On the other hand, when average wheel speed Vfa of front wheels FL and FR exceed average wheel speed Vra of rear wheels RL and RR, wheel speed sensor abnormality detecting portion 44 determines that wheel speed sensors 50*a*–50*d* are normal (step S08), and ends the abnormality detection operation.

When the vehicle employs rear-wheel drive base standby 4WD scheme where rear wheels RL and RR are the driving wheels and front wheels FL and FR are the idler wheels, at step S03 in FIG. 3, wheel speed sensor abnormality detecting portion 44 detects that average wheel speed Vfa of front wheels FL and FR exceeds average wheel speed Vra of rear wheels RL and RR, and determines that wheel speed sensors 50*a*–50*d* are abnormal.

Next, at step S04, when wheel speed sensor abnormality detecting portion 44 detects abnormality of wheel speed sensors 50*a*–50*d* (step S04), it generates signal AD specifying the detection result and output to power transmission controlling portion 46.

In response to input of signal AD, power transmission controlling portion 46 determines as to whether or not the current vehicle driving state is four-wheel drive (step S05). When it is determined that the vehicle driving state is four-wheel drive at step S05, power transmission controlling portion 46 sets control current Itr to 0 that is output to linear solenoid valve 60, and stops four-wheel drive control (step S07). Thus, the vehicle driving state shifts from four-wheel drive to two-wheel drive.

On the other hand, if it is determined at step S05 that the vehicle driving state is not four-wheel drive, that is, it is two-wheel drive, then power transmission controlling portion 46 sets control current Itr to 0 and prohibits actuation of four-wheel drive, and continues current two-wheel drive (step S06).

While the example where the abnormality detecting apparatus for wheel speed sensors is applied to a standby 4WD vehicle has been described in the present embodiment, it is also applicable to two-wheel drive vehicle employing either front wheels or rear wheels as the driving wheels. Specifically, when the abnormality detecting apparatus for wheel speed sensors according to the present invention is applied to a two-wheel drive vehicle, it is configured such that, in the abnormality detecting operation, abnormality of wheel speed sensors is detected based on detection that the average wheel speed of the idler wheels has exceeded the average wheel speed of the driving wheels.

As above, according to the embodiment of the present invention, with a simple apparatus configuration, the detection accuracy of the abnormality detecting apparatus for wheel speed sensors can further be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An abnormality detecting apparatus for wheel speed sensors detecting abnormality of wheel speed sensors arranged at each of driving wheels and idler wheels of a vehicle, wherein
said wheel speed sensors detect rotational speeds of corresponding said driving wheels and said idler wheels,
said abnormality detecting apparatus for wheel speed sensors comprises:
a wheel speed calculating portion calculating wheel speeds of said driving wheels and wheel speeds of said idler wheels based on the detected rotational speeds of said driving wheels and the detected rotational speeds of said idler wheels, respectively; and
an abnormality detecting portion detecting abnormality of said wheel speed sensors based on the calculated wheel speeds, wherein
said abnormality detecting portion detects the abnormality of said wheel speed sensors based on: a first wheel speed that is at least one of the wheel speeds of said driving wheels and said idler wheels being substantially zero; at least one of the wheel speeds except for said first wheel speed being greater than a prescribed threshold value;
and an average wheel speed of left and right said idler wheels being greater than an average wheel speed of left and right said driving wheels.

2. The abnormality detecting apparatus for wheel speed sensors according to claim 1, wherein
said vehicle includes a power transmission transmitting motive power to said idler wheels, and
said abnormality detecting portion stops a motive power transmission operation of said power transmission when abnormality of said wheel speed sensors is detected.

3. The abnormality detecting apparatus for wheel speed sensors according to claim 2, wherein
said power transmission transmits to said idler wheels motive power commensurate to a relative rotation number between said driving wheels and said idler wheels.

4. The abnormality detecting apparatus for wheel speed sensors according to claim 1, wherein
said prescribed threshold value is a detection value of said wheel speeds that can be detected by said wheel speed sensors when said vehicle travels normally, and it is a value greater than a maximum value of said wheel speeds detected when said vehicle makes a turn.

5. An automobile, comprising:
a motive power source;
driving wheels that receive motive power transmitted from said motive power source and drive;
idler wheels;
wheel speed sensors arranged at each of said driving wheels and said idler wheels for detecting rotational speeds of corresponding said driving wheels and said idler wheels; and
the abnormality detecting apparatus for wheel speed sensors detecting abnormality of said wheel speed sensors according to any of claims 1–4.

* * * * *